Nov. 27, 1962 P. PATZ ETAL 3,065,996
SILO UNLOADER CLUTCH MECHANISM
Filed Aug. 14, 1961 3 Sheets-Sheet 1

INVENTORS
PAUL PATZ
BY EDWARD A. GRAETZ

Lieber, Lieber & Nilles
ATTORNEYS

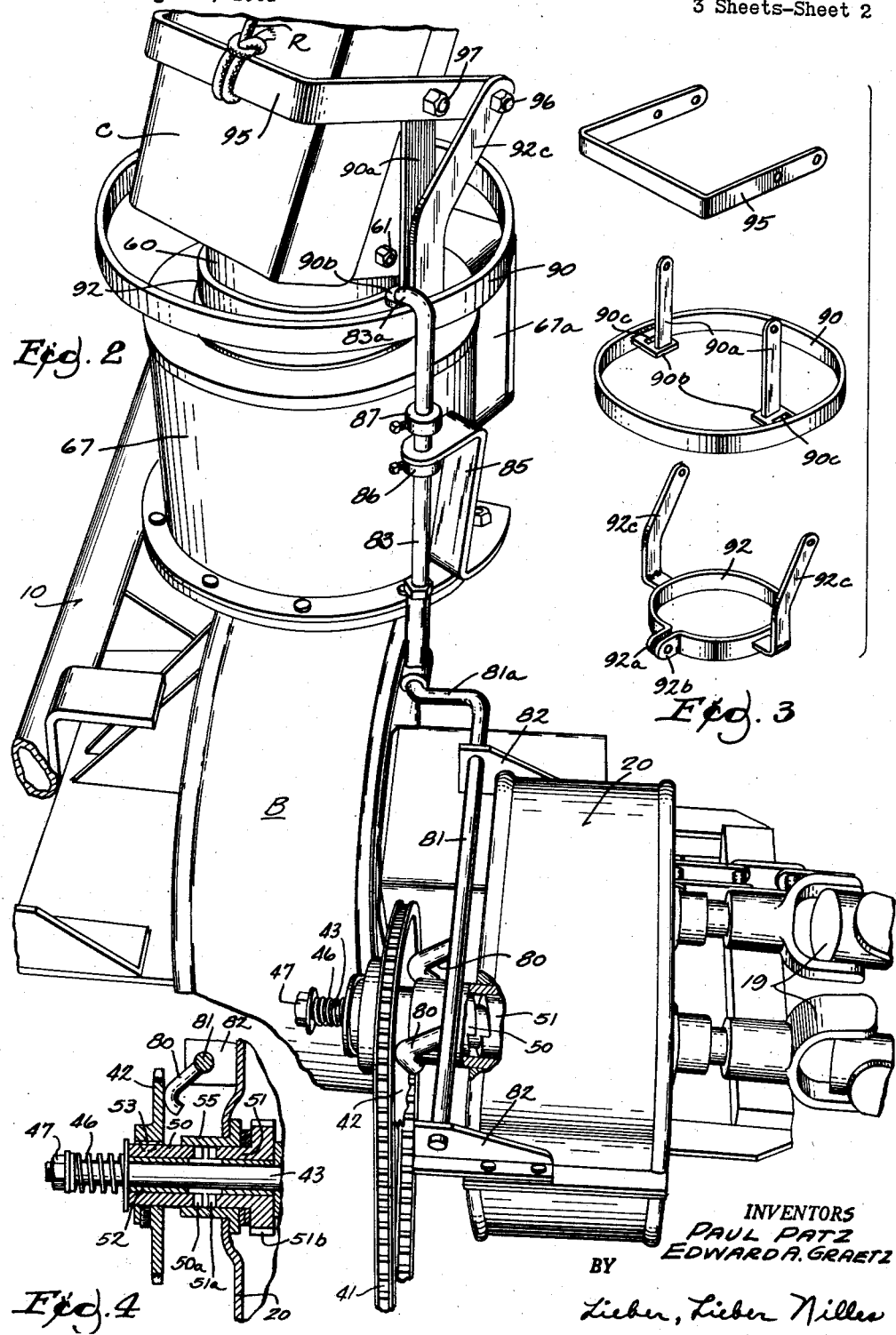

Nov. 27, 1962  P. PATZ ETAL  3,065,996
SILO UNLOADER CLUTCH MECHANISM
Filed Aug. 14, 1961  3 Sheets-Sheet 3
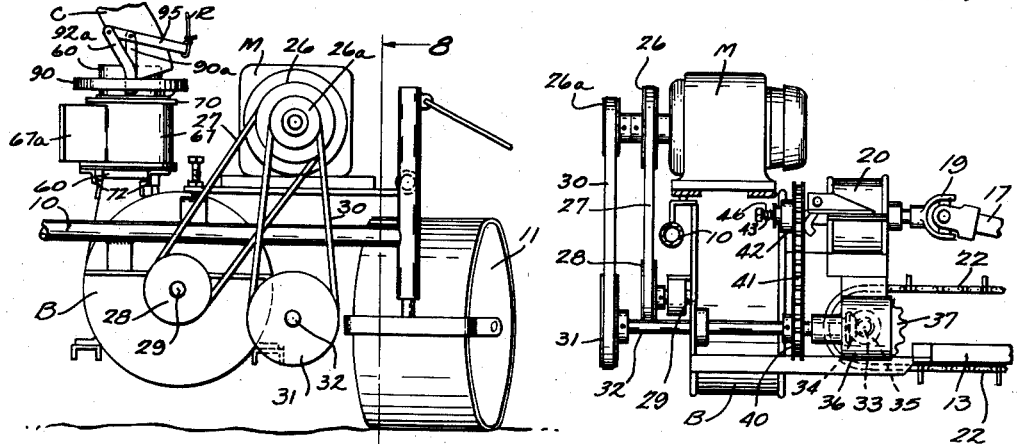
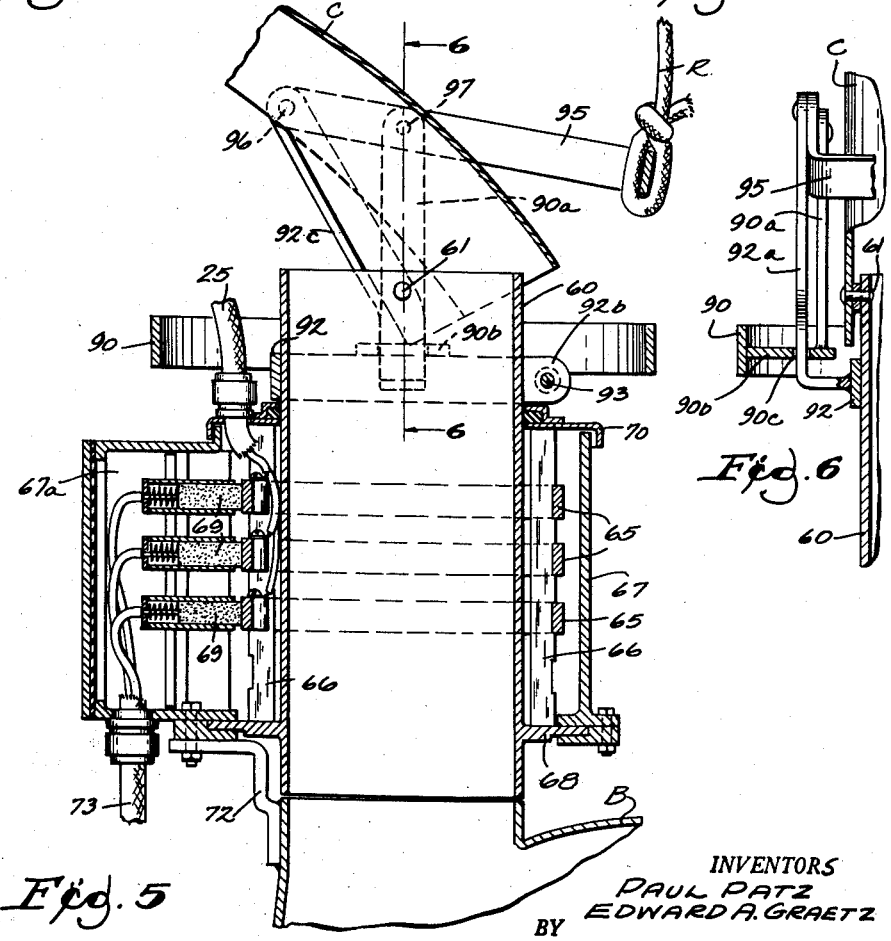
INVENTORS
PAUL PATZ
EDWARD A. GRAETZ
BY
Lieber, Lieber & Niller
ATTORNEYS

United States Patent Office

3,065,996
Patented Nov. 27, 1962

3,065,996
SILO UNLOADER CLUTCH MECHANISM
Paul Patz and Edward A. Graetz, Pound, Wis.
Filed Aug. 14, 1961, Ser. No. 131,141
2 Claims. (Cl. 302—56)

The present invention relates generally to silo unloaders of the type including an elongated rigid frame radiating from and revolving generally about the vertical axis of the silo and having thereon a conveyor for moving ensilage from the top of the mass and inwardly toward said silo axis and into a blower. The material is then delivered by the blower through a non-revolving conduit and out of an opening in the silo wall. These devices furthermore have traction wheels which drive the conveyor around the silo and which derive their power from an electric motor carried on the revolving conveyor frame. This motor usually also furnishes power to drive the conveyor for moving the ensilage radially inwardly and for driving the blower to discharge the ensilage out of the silo. The same motor may also provide power for other auxiliary equipment carried by the unloader such as a power cutter for cleaning the inner wall of the silo.

Unloaders of this type thus are generally comprised of a conveyor which is revolved around the silo and a stationary conduit.

These unloaders are preferably started by the operator who is located down in the barn and simply by throwing an electrical switch to start the electric motor carried on the unloader up in the silo. Thus, it is unnecessary for the operator to crawl up into the silo to start or stop the unloader.

There are instances, however, when it is necessary for the operator to crawl into the silo to start the unloader. For example, when the unloader was left standing overnight, the material in the conveyor and in the blower may have become frozen and simply throwing the electric switch would not cause the unloader to start, and this was particularly true if a centrifugal type clutch was used to clutch the motor to the various parts, such as, the traction wheels. It is therefore desirable to be able to completely clear or empty the unloader of the ensilage therein before shutting it off entirely.

It is also desirable to be able to periodically stop the forward rotation of the unloader without stopping the conveyor or blower in order, for example, that the ensilage being deposited outside and adjacent the bottom of the silo may be moved away to prevent it from piling up excessively.

In an unloader of the above type which has a motor revolvable with the conveyor, it has heretofore been difficult to operate a positive acting clutch from a remote location in order to stop forward rotation of the unloader in the silo, while at the same time permitting the other parts of the unloader to continue to function.

It is accordingly an object of the present invention to provide a clutch operating mechanism for a silo unloader of the above type, which mechanism can be operated from a location remote from the unloader. The arrangement is such that part of the clutch operating mechanism can revolve with the conveyor around the silo while another part of the mechanism is mounted on and stationary along with the discharge conduit. The two parts of the clutch mechanism are always in operative relationship with one another regardless of the relative position between the conveyor and conduit.

By means of the present invention, a positive engagement clutch can be utilized and remotely operated to interrupt the drive to the traction wheels of the unloader prior to or without stopping the other operating parts of the unloader. In this manner, the unloader can be completely cleared or emptied of ensilage before it is shut off entirely, and thereby prevented from freezing up and requiring manual breaking loose of the parts before restarting can be accomplished. In addition, the unloader periodically and from a remote location can be easily and only momentarily stopped in its forward travel to interrupt the ensilage discharge out of the silo and without the necessity of shutting down the entire unloader.

These and other objects and advantages of the present invention will appear later as this disclosure progresses, reference being had to the accompanying drawings, in which:

FIGURE 2 is an enlarged, perspective view of the clutch mechanism of the unloader shown in FIGURE 1, but with the electric driving motor removed, and with certain parts broken away;

FIGURE 3 is a perspective, exploded view of certain parts of the clutch operating mechanism;

FIGURE 4 is a fragmentary, elevational view, in section, of the clutch elements shown in FIGURE 2;

FIGURE 5 is an elevational view, in section, through the rotary joint as shown in FIGURE 2;

FIGURE 6 is a fragmentary, sectional view taken along line 6—6 in FIGURE 5;

FIGURE 7 is a rear, elevational view of a portion of the machine as shown in FIGURE 1, certain parts being shown as broken away or removed for clarity, and FIGURE 8 is a side elevational view of the FIGURE 7 device, the view being a sectional one taken generally from line 8—8 in FIGURE 7.

Figure 1:
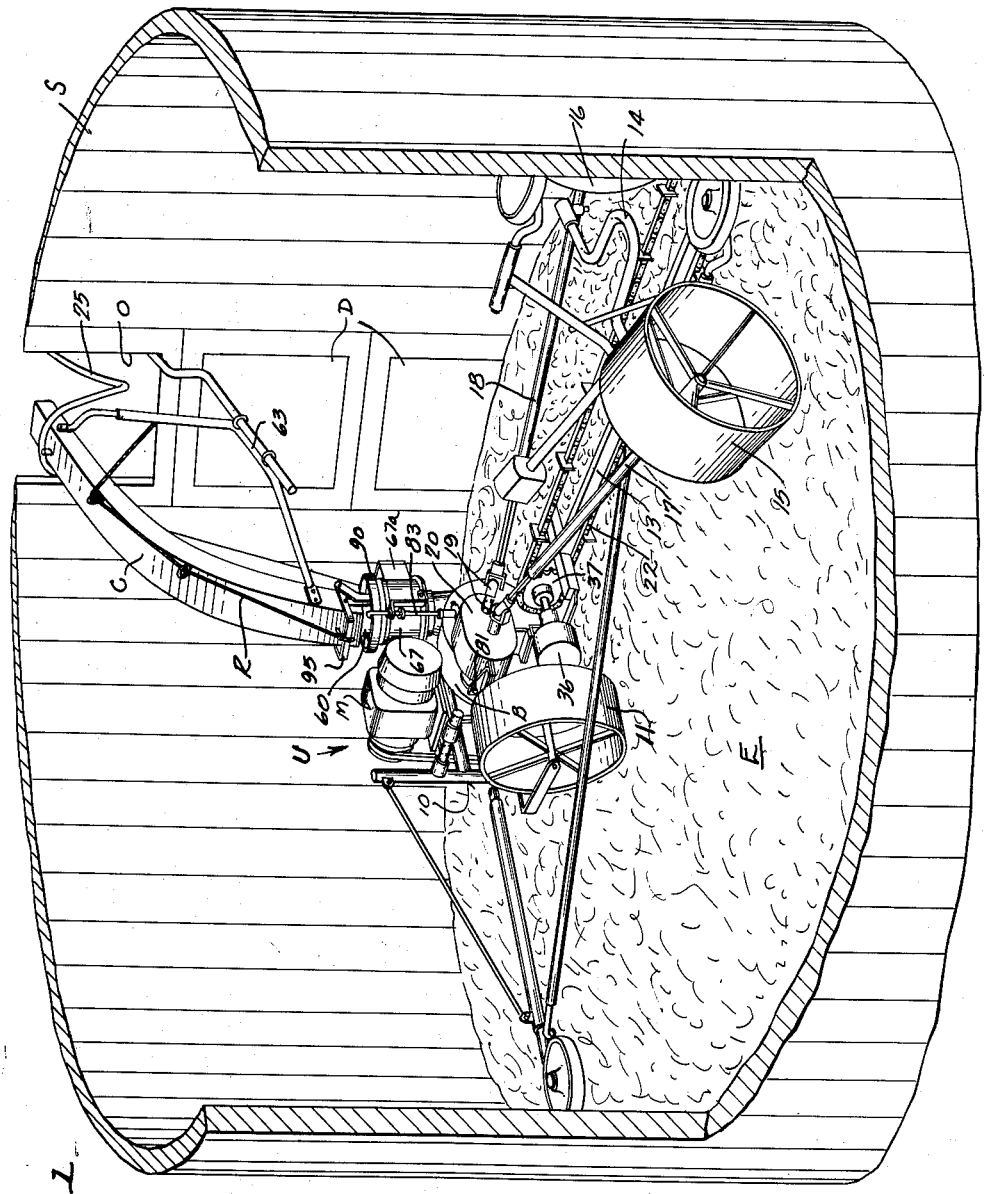
FIGURE 1 is a perspective view of a silo unloader made in accordance with the present invention and showing it in use in a silo, the walls of the silo shown as being broken away for clarity.

FIGURE 1 shows a silo S having ensilage E therein and a series of vertically arranged, removable doors D which are successively removed as the unloader U works its way downwardly in the silo as it unloads the latter. When a door is removed, it provides a discharge opening O through which the non-revolvable conduit C blows the ensilage. The ensilage then drops by gravity down a chute (not shown) which is located along the outside of the silo wall.

General Unloader Arrangement

The unloader comprises a main frame 10 supported near the center of the silo by a pair of idler wheels 11 (only one shown), and a conveyor frame 13 is mounted to the main frame and extends radially adjacent the inner wall surface of the silo wall. The outer end of the conveyor frame is supported by a depth and leveling frame 14 which, in turn, is supported by the two traction wheels 15 and 16. Drive shafts 17 and 18 are drivingly connected at their outer ends to their respective traction wheels 15 and 16 and are connected at their inner ends, through suitable universal joints 19, respectively, to the gear box 20.

The main frame supports a conventional blower B which receives ensilage that has been moved radially inwardly by the endless gathering chain or conveyor 22 carried on the conveyor frame 13. The blower B then acts in the well-known manner to blow ensilage through the conduit C and out opening O.

Power Source

The power for operating all of the various parts of the unloader is derived from the electric motor M carried on the main frame. The electrical power for the motor is furnished through the cord 25 which is supported by the stationary conduit and extends out of the opening O and to a source of power (not shown). The motor may be turned off by means of an electrical switch, not shown, but usually located down at the base of the silo. Thus, the entire mechanism may be turned off without the necessity of climbing up into the silo which is often a difficult task.

Power Drives

The power drives from the electric motor M to the blower, gathering conveyor, and traction wheels will now be described. Generally, the arrangement is such that the blower and conveyor are driven as long as the motor is operating, but the power to the traction wheels can be interrupted by a clutch of the positive engagement type. In this manner, the forward movement of the unloader may be stopped while the blower and gathering conveyor can continue to function.

The electric motor shaft has two pulleys 26, 26a (FIGURES 7 and 8) fixed thereto. A belt 27 is trained over pulley 26 and also over a pulley 28 fixed to the fan shaft 29 of the blower B, thereby directly connecting the blower to the motor.

Another belt 30 is drivingly trained over pulley 26a and also over pulley 31 fixed to the main drive shaft 32. A conveyor drive shaft 33 (FIGURES 1 and 8) is driven from the main shaft 32 through its suitable bevel gears 34 and 35, these gears being located in the gear housing 36 carried by the main frame. A conveyor drive sprocket 37 is fixed to shaft 33 and the endless conveyor 22 is trained therearound and driven thereby.

The drive to the traction wheels is as follows. A sprocket 40 (FIGURE 8) is also fixed to main shaft 32 and through a flexible chain 41, and a sprocket 42 acts to drive (through clutch means to be described) a traction drive shaft 43. Shaft 43 is suitably journaled in the gear box 20 carried on the main frame and which drives the traction wheel shafts 17 and 18 through suitable gearings (not shown) located in the gear box 20.

The drive between the sprocket 40 and its shaft 43 can be interrupted by axially shifting a sprocket 42 to the left (as viewed in FIGURE 2) by means presently to be described. The sprocket is resiliently biased to the right, that is, into the clutch engaged position, by the spring 46 carried around the outer end of shaft 43 and held captive thereon by cap bolt 47.

Complementary clutch sleeves or members 50 and 51 (FIGURES 2 and 4) having interengaging teeth 50a and 51a are carried by shaft 43. Member 51 has a gear portion 51b (FIGURE 4) which meshes with suitable gearing (not shown) in the box 20 for driving the shafts 17 and 18. This gearing and box are, in themselves, conventional but it should be noted that the clutch members are positive in their engagement and disengagement. Member 50 is mounted on a sleeve bushing 52 and is positively driven with the sprocket by key 53 located therebetween and is also axially shiftable with the sprocket on shaft 43 so as to engage or disengage the complementary clutch member 51. Member 50 and the sprocket are not fixed to shaft 43 but can rotate thereon when the clutch is disengaged. Members 50 and 51 are both mounted in the large bushing 55 supported in the box 20. Member 51 is axially fixed on and also secured to shaft 43 for rotation therewith.

With the above arrangement, the electric motor, which is carried on the revolvable unloader, receives its electrical power from outside the silo through the electrical cord 25 extending out of the silo and supported by the non-revolvable conduit.

Rotary Electrical Joint

As shown in detail in FIGURE 5, rotary electrical connections are provided at the joint between the non-revolvable discharge conduit C and the rest of the unloader which revolves around the silo and moves in respect to the conduit.

A stationary discharge tube 60 sets on top of the blower B and receives ensilage directly therefrom due to the centrifugal blast action of the blower. The discharge conduit C is vertically swingable within limits, about the bolt means 61 which extend through adjacent sides of the conduit and tube. A brace 63 (FIGURE 1) holds the conduit in any desired vertical position.

The drawings show a single-phase wiring setup, but, of course, a three-phase system could be employed using four electrical contact rings and using four wires instead of the three shown.

As shown clearly in FIGURE 5, three electrical contact rings 65 are mounted around the tube 60 on vertically disposed insulating bars 66 spaced circumferentially around the tube. As the machine revolves around the silo, the tube 60, bars 66, and rings 65 remain stationary. A housing 67 is mounted for rotation on a flange 68 extending from the tube and has an enlarged side box 67a which covers the brushes 69 that slide around the rings 65 so as to make continuous electrical contact therewith. A cover 70 is secured to tube 60 for rotation therewith and relative to the housing 67 over which it shieldingly extends. The housing 67 is connected to the blower for revolving therewith around the silo, by means of a series of brackets 72 (only one shown). The three-wire line 25 is in contact with the rings 65, while a similar three-wire line 73 electrically connects the brushes with the motor M.

Clutch Operating Mechanism

Means will now be described for remotely operating the clutch from the outside of the silo, even though the clutch and drives associated therewith may be revolving about the silo, and regardless of the position of the unloader in its circular path. The arrangement permits the forward travel of the unloader to be stopped, but permits the blower, gathering conveyor, and other operating parts, such as a power cutter (not shown) for cleaning the inner surface of the silo wall, to continue to operate and thereby allow the unloader to clear itself of ensilage. This is desirable just prior to turning off the unloader completely as by throwing the main electrical switch, so as to prevent freezing of the material in the machine if operation is not to be resumed soon. Delay in forward travel of the machine may also be desirable to permit the ensilage delivered to the outside of the silo to be moved away because the capacity of the unloader may be greater than that of the equipment (not shown) which is used to move the discharged ensilage to other locations.

The clutch operating mechanism for axially shifting the sprocket 42 and thereby connecting or disconnecting the power drive to the traction wheels is as follows. A clutch shifter in the form of a shifter fork 80 is oscillatably mounted by its rod 81 in the pair of brackets 82 secured to the box 20. The rod 81 has an up-turned crank portion 81a which is pivotally inserted in the lower end of the vertically positioned shifter rod 83. Rod 83 is secured to the housing 67 for revolving around the silo therewith, by a bracket 85. A pair of adjustable lock collars 86, 87 are secured to rod 83 for contacting the free end of bracket 85; the spring 46 normally biases the collar 87 downwardly, and the collar 87 is so positioned on the rod so that the upper, curved or hook end 83a of rod 83 does not quite contact a vertically shiftable operator ring 90, but instead can move over the ring as it rotates relative thereto, as will more fully appear.

The collar 86, one the other hand, is so positioned on rod 83, so as to limit upper movement of rod 83 and ring 90 when the traction drive is interrupted by declutching, as will also more fully appear.

The forked rod 81 and its associated shifter rod 83 are mounted on and revolve with the frame and can be considered as the clutch shifter.

The vertically shiftable, operator ring 90 is secured to tube 60 for rotation therewith but vertical movement relative thereto, by means of a clamping ring 92 which can be fixed to the tube 60 by bolt means 93 which extend through its spaced apart, apertured ends 92a and 92b. A pair of upstanding arms 92c are secured at their lower ends to the ring 92 and are pivotally connected at their upper, free ends to the free ends of a lifting yoke 95 by bolt means 96. Yoke 95 is also pivotally connected intermediate the length of its arms, by bolt means 97, to the upper ends of arms 90a which are fixed to the ring 90 by their respective lugs 90b. Lugs 90b each have a slot 90c so that the ring is slidable on and guided by the arms 92c which extend through the slots 90c.

An opearting rope R is secured to the bail end of the yoke and extends over the conduit and then out the silo and downwardly where is can be pulled from the ground level. Thus, the ring 90, its associated rope-operated yoke 95 are stationarily or non-revolvably mounted together with the conduit and may be considered as the shifter operator.

The above-described clutch operating mechanism provides a continuous operating connection between the non-revolving conduit C and the rest of the revolving machine. Pulling the rope R can be done from the ground level and this acts to lift the ring 90, which, in turn, then contacts the hook end 83a and lifts rod 83. This movement causes rod 81 to rotate slightly and urge the sprocket 42 axially and against the bias of spring 46, thereby declutching the power drive to the traction wheels and stopping forward travel of the machine around the silo. The blower and conveyor will continue to operate to thereby clear the machine, after which the machine simply stands still and runs empty. The machine can then either be shut off completely by throwing the main electrical switch (not shown) through which electrical power is furnished to the motor M, or the machine can again be put into operation by releasing the rope to cause the positive acting clutch members to again be engaged.

Various modes of carrying out the invention are contemplated as being within the scope of the following claims particularly pointing out and distinctly claiming the subject matter which is regarded as the invention:

We claim:

1. A silo unloader comprising, a frame radiating from and revolvable about the vertical axis of a silo, a traction wheel for supporting and revolving said frame, a conveyor carried by said frame for moving ensilage toward said axis, a blower carried on said frame and in ensilage receiving communication with said conveyor, a non-revolving conduit mounted on said blower for relative movement therebetween and for receiving ensilage therefrom and conducting it from the silo, power means carried on said frame and drivingly connected with said conveyor and blower for operation thereof, power transmitting means including a clutch between said power means and said traction wheel, a clutch shifter including a vertically shiftable rod mounted on said frame for revolving therewith and engageable with said clutch for disengagement thereof, and a vertically movable ring shiftably mounted on said conduit for remaining stationary therewith in the silo in respect to revolving movement of the frame and blower, said rod having an end extending above said ring for engagement and shifting thereby when said ring is raised a predetermined amount and regardless of the relative position between said blower and conduit.

2. A silo unloader comprising, a frame radiating from and revolvable about the vertical axis of a silo, a traction wheel for supporting and revolving said frame, a conveyor carried by said frame for moving ensilage toward said axis, a blower carried on said frame and in ensilage receiving communication with said conveyor, a non-revolving conduit having a rotatable connection with said blower by means of which it is mounted thereon for receiving ensilage therefrom and conducting it from the silo, power means carried on said frame and drivingly connected with said conveyor and blower for operation thereof, power transmitting means including a clutch between said power means and said traction wheel, a clutch shifter mounted on said frame and engageable with said clutch for disengageable thereof, and a ring mounted around said conduit but movable in one direction in respect thereto and also remaining stationary therewith in the silo in respect to revolving movement of the frame and blower, said shifter including a shiftable rod extending over said ring and revolvable therearound, said rod being shiftable by movement of said ring to thereby disengage said clutch regardless of the relative position between said blower and conduit.

References Cited in the file of this patent

UNITED STATES PATENTS

| | | |
|---|---|---|
| 2,671,696 | McLean | Mar. 9, 1954 |
| 2,788,247 | Chapman | Apr. 9, 1957 |
| 2,858,033 | Hofer | Oct. 28, 1958 |